United States Patent
Kempner et al.

(10) Patent No.: US 9,383,236 B2
(45) Date of Patent: Jul. 5, 2016

(54) PROCESS MEASUREMENT PROBE BOTTOMING INDICATOR

(71) Applicant: Dieterich Standard, Inc., Boulder, CO (US)

(72) Inventors: Alan Blaine Kempner, Milton, VT (US); Nathaniel Kirk Kenyon, Boulder, CO (US); Darrel Francis Coleman, Boulder, CO (US)

(73) Assignee: Dieterich Standard, Inc., Boulder, CO (US)

( * ) Notice: Subject to any disclaimer, the term of this patent is extended or adjusted under 35 U.S.C. 154(b) by 5 days.

(21) Appl. No.: 14/489,806

(22) Filed: Sep. 18, 2014

(65) Prior Publication Data

US 2016/0084688 A1    Mar. 24, 2016

(51) Int. Cl.
*G01F 15/00*   (2006.01)
*G01F 1/46*    (2006.01)

(52) U.S. Cl.
CPC ........................................ *G01F 1/46* (2013.01)

(58) Field of Classification Search
None
See application file for complete search history.

(56) References Cited

U.S. PATENT DOCUMENTS

| | | | | |
|---|---|---|---|---|
| 4,020,690 A | * | 5/1977 | Samuels | G01F 23/16 73/299 |
| 4,250,895 A | * | 2/1981 | Lees | G01B 13/14 33/514 |
| 4,559,836 A | * | 12/1985 | Coleman | G01F 1/46 73/861.66 |
| 4,631,683 A | | 12/1986 | Thomas et al. | |
| 4,645,242 A | * | 2/1987 | Coleman | F16L 41/082 285/141.1 |
| 4,717,159 A | | 1/1988 | Alston et al. | |
| 5,046,482 A | * | 9/1991 | Everest | A61B 19/46 374/130 |
| 5,058,433 A | | 10/1991 | Wilson et al. | |
| 5,060,522 A | | 10/1991 | Lew | |
| 5,123,288 A | * | 6/1992 | Tench | G01P 5/165 73/202.5 |
| 5,152,181 A | | 10/1992 | Lew | |
| 5,178,019 A | * | 1/1993 | Keiter | G01F 23/263 73/863.11 |
| 5,410,920 A | | 5/1995 | Westwick | |
| 6,024,565 A | * | 2/2000 | Sicurelli | A61C 19/041 433/102 |
| 6,164,143 A | | 12/2000 | Evans | |
| 8,448,515 B2 | | 5/2013 | Orleskie | |
| 2005/0090961 A1 | * | 4/2005 | Bonk | B07C 5/3425 701/50 |

(Continued)

FOREIGN PATENT DOCUMENTS

WO        WO 99/24838        5/1999

OTHER PUBLICATIONS

Notice of Transmittal of the International Search Report and the Written Opinion of the International Searching Authority, from PCT/US2015/032858, dated Aug. 5, 2015.

(Continued)

*Primary Examiner* — Harshad R Patel
(74) *Attorney, Agent, or Firm* — Westman, Champlin & Koehler, P.A.

(57) ABSTRACT

Systems and methods are disclosed for indicating bottoming contact between an inner wall of a fluid carrying conduit and a distal tip process measurement probe. A process device, such as a fluid flow meter, has a process measurement probe configured for insertion into the fluid carrying conduit. An insertion mechanism is coupled to the process measurement probe and configured to apply force to insert the process measurement probe into the fluid carrying conduit. A bottoming indicator is configured to provide an indication of proper bottoming of the distal tip of the process measurement probe against the inner wall of the fluid carrying conduit as a function of an insertion related force or pressure.

22 Claims, 6 Drawing Sheets

(56) References Cited

U.S. PATENT DOCUMENTS

| | | | |
|---|---|---|---|
| 2005/0217389 A1 | 10/2005 | Foster | |
| 2006/0266111 A1* | 11/2006 | Gourlay | G01F 23/162 |
| | | | 73/299 |
| 2008/0238697 A1 | 10/2008 | McMillan | |
| 2008/0239303 A1* | 10/2008 | McDaniel | G01N 21/954 |
| | | | 356/241.1 |
| 2011/0107847 A1 | 5/2011 | Strom | |
| 2011/0146405 A1* | 6/2011 | Orleskie | G01F 1/34 |
| | | | 73/579 |
| 2015/0276461 A1* | 10/2015 | Guzman | G01F 23/284 |
| | | | 73/290 V |

OTHER PUBLICATIONS

Office Action from U.S. Appl. No. 12/640,414, dated Jun. 19, 2012.

\* cited by examiner

PROCESS MEASUREMENT PROBE BOTTOMING INDICATOR

BACKGROUND

The present disclosure relates to industrial process control or monitoring systems. More specifically, the present disclosure relates to process variable transmitters or sensing devices of the type which use averaging pitot tube (APT) probes or other primary sensing probes to measure a process variable of an industrial process.

In industrial settings, control systems are used to monitor and control industrial processes, and the like. Typically, the control system that performs these functions uses field devices distributed at key locations in the industrial process and coupled to control circuitry in the control room by a process control loop. The term "field device" refers to any device that performs a function in a distributed control or process monitoring system, including all devices used in the measurement, control and monitoring of industrial processes.

Some field devices include a transducer which couples to the process fluid. A transducer is understood to mean either a device that generates an output signal based on a physical input or that generates a physical output based on an input signal. Typically, a transducer transforms an input into an output having a different form. Types of transducers include various analytical equipment, pressure sensors, thermistors, actuators, solenoids, indicator lights, and others.

Field devices, such as process variable sensors used in industrial processes can be installed in the field on pipelines, tanks and other industrial process equipment. One type of process variable sensor is a flow meter that can measure a rate of fluid flow, for example. One type of flow meter, which employs an averaging pitot tube (APT) primary element, is a popular device for flow measurement because of its ability to be inserted into and retracted from a flow line, its low pressure loss, relatively low cost and reliable performance. The APT primary element senses and averages pressures from multiple locations across a pipeline through which a process fluid is traveling. This average pressure is then used in conjunction with flow theory and experimentally determined quantities to provide a flow measurement for the fluid. One type of APT is the Annubar® APT available from Emerson Process Management™. At least for Annubar® type APTs, it is preferred that the APT span the process pipeline such that multiple samples across a section of the pipeline can be averaged to account for variations in flow across the section.

Some types of APT primary elements for differential pressure flow meters can be installed in a process pipe while a process is in service. To assure APT primary element longevity and accuracy, the tip of the APT primary element must firmly seat against the opposite side of the process piping from which it is mounted. If an APT primary element is not inserted fully, it will vibrate due to vortex shedding and send a poor signal to the secondary element (e.g., the transmitter) or break apart causing damage downstream. If the APT primary element is over-inserted, it can buckle resulting in the same problems as not bottoming-poor signal, breakage, and damage to the piping.

A commonly used method of installing an APT primary element into process piping uses a marking on the insert/retract control rods. In an attempt to ensure proper tip APT tip bottoming against the opposite interior wall of the process piping is to insert the APT primary element until a marking on the insert/retract rods nears the gear boxes. used to control insertion. Once the marking nears the gear box, the installer is required to "feel" when the crank handle on the gear box becomes more difficult to turn. The added difficulty to turn the gear box handle is the installer's indication that the tip has bottomed on the opposite side of the pipe. However, it can be extreme difficulty to "feel" when the tip bottoms against the opposite wall. This is because the gear boxes used to insert the APT primary element provide such a mechanical advantage that the additional force of the tip bottoming is negligible compared to the other installation forces of packing gland resistance and process pressure. Not being able to easily tell the difference between a bottomed and un-bottomed tip, it is easy for the installer to either not bottom the APT primary element, or to overload and damage the APT primary element. This results in a failure rate of the APT primary element, sometimes as high as five percent, due to poor installations.

The discussion above is merely provided for general background infoimation and is not intended to be used as an aid in determining the scope of the claimed subject matter.

SUMMARY

Systems and methods are disclosed for indicating bottoming contact between an inner wall of a fluid carrying conduit and a distal tip process measurement probe. A process device, such as a fluid flow meter, has a process measurement probe configured for insertion into the fluid carrying conduit. An insertion mechanism is coupled to the process measurement probe and configured to apply force to insert the process measurement probe into the fluid carrying conduit. A bottoming indicator is configured to provide an indication of proper bottoming of the distal tip of the process measurement probe against the inner wall of the fluid carrying conduit as a function of an insertion related force or pressure.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

BRIEF DESCRIPTION OF THE DRAWINGS

FIGS. 5-1 through 5-6 are diagrammatic illustrations of components configured to provide a visual indication of the various stages of insertion of the APT primary element into a conduit.

DETAILED DESCRIPTION OF ILLUSTRATIVE EMBODIMENTS

Disclosed embodiments provide averaging pitot tube (APT) primary element tip bottoming methods, systems and apparatus which provide an indication of when the APT primary element has been properly inserted into a fluid carrying conduit. However, the disclosed embodiments are applicable to any process measurement probe. In some exemplary embodiments, the methods, systems and apparatus directly measure or identify insertion and bottoming forces to assure proper installation of the APT primary element. By ensuring proper APT bottoming during installation, vibrations due to vortex shedding and the resulting poor signal quality can be reduced. Further, breaking of the APT primary element due to under-insertion or over-insertion (e.g., from buckling), and the resulting downstream damage, can be prevented or reduced.

In some disclosed embodiments, an insertion mechanism is coupled to the APT primary element of a fluid flow meter or transmitter to control insertion and retraction of the APT primary element from a conduit. A bottoming indicator is configured to provide an indication of proper bottoming of the distal tip of the APT primary element against the inner wall of the fluid carrying conduit as a function of an insertion related force or pressure. In some embodiments, one or more springs are included in the bottoming indicator to transfer force from the insertion mechanism to the APT primary element. The springs can be selected to compress in response to application of the force from the insertion mechanism to the APT primary element and to provide a visual indication of when the APT primary element is properly bottomed so that further force is not applied and the primary element is not damaged. Other visual indications of proper bottoming can also be provided. In some embodiments, the bottoming indicator is configured to provide an output signal indicative of proper bottoming of the distal tip of the APT primary element such that the output signal can be directly or indirectly used to control the insertion mechanism. Thus, the process can be automated while also insuring proper bottoming of the APT primary element without causing damage.

Figure 1:
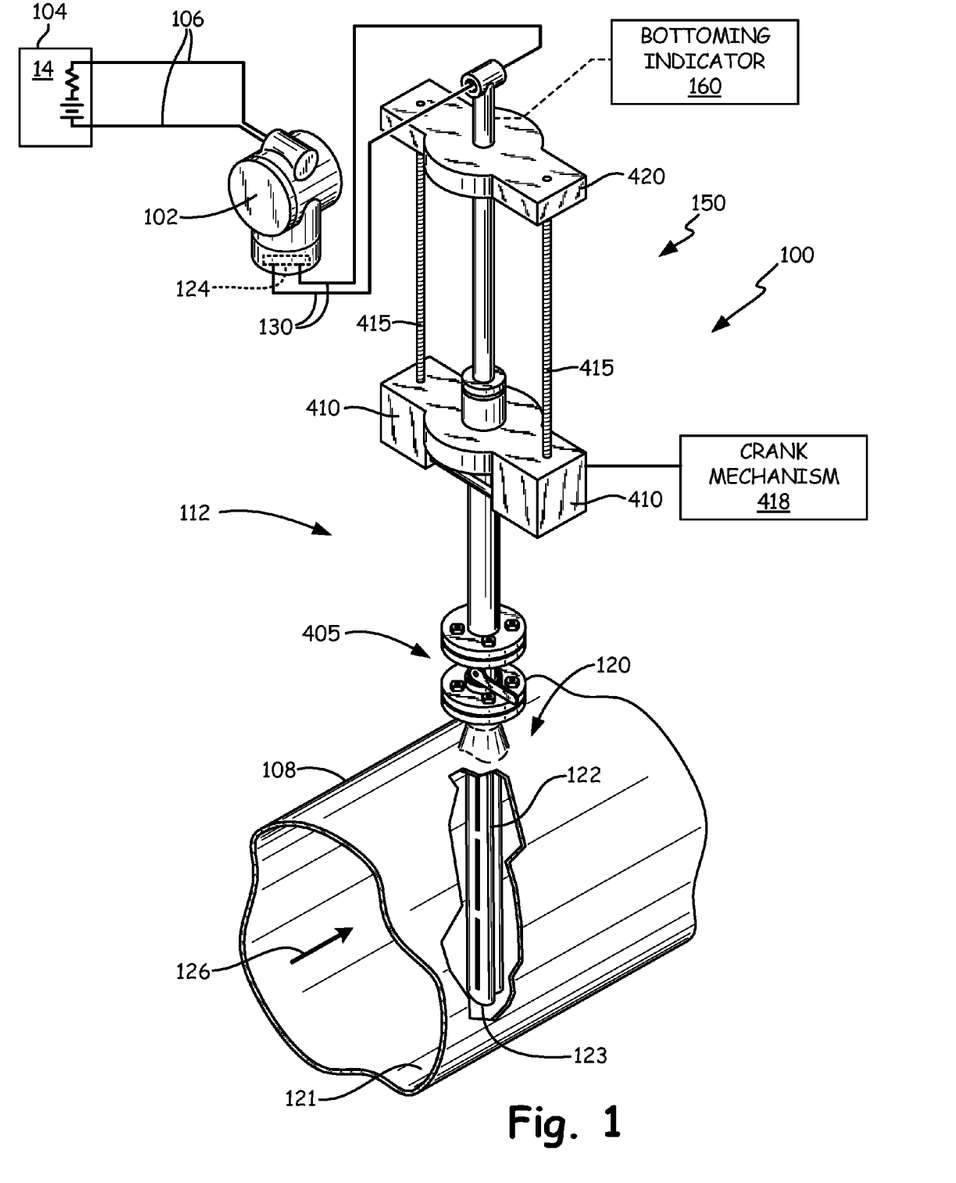
FIG. 1 is a diagrammatic illustration of an industrial process control or monitoring system for use in monitoring or controlling a process fluid in accordance with an example embodiment in which the system indicates bottoming contact between an inner wall of a conduit and an averaging pitot tube (APT) primary element.

Some industrial process control or monitoring systems, for example some differential pressure (DP) based control or monitoring systems, utilize an APT probe or primary element inserted into a conduit such as a process pipe or duct to measure a differential pressure related of flow of material through the conduit. One such industrial process control or monitoring system 100 is shown in FIG. 1. FIG. 1 is a simplified diagram showing system 100 for use in monitoring or controlling a process fluid in an industrial process. System 100 also provides an indication of bottoming contact between an inner wall of a fluid carrying conduit or process piping and a distal tip of an APT primary element.

Typically, a field device such as a process variable transmitter 102 is located at a remote location in a process facility, and transmits a sensed process variable back to a centrally-located control room 104. Various techniques can be used for transmitting the process variable, including both wired and wireless communications. One common wired communication technique uses what is known as a two-wire process control loop 106 in which a single pair of wires is used to both carry information as well as provide power to the transmitter 102. One technique for transmitting information is by controlling the current level through the process control loop 106 between 4 mA and 20 mA. The value of the current within the 4-20 mA range can be mapped to corresponding values of the process variable. Example digital communication protocols include HART® (a hybrid physical layer consisting of digital communication signals superimposed on a standard 4-20 mA analog signal), FOUNDATION~ Fieldbus (an all-digital communication protocol promulgated by the Instrument Society of America in 1992), Profibus communication protocol, or others. Wireless process control loop protocols, such as radio-frequency communication techniques including WirelessHART® in accordance with IEC 62591, may also be implemented. Process control loop 106 in FIG. 1 represents either or both of wired and wireless embodiments of communication connections between transmitter 102 and control room 104.

Process variable transmitter 102 is connected via a mounting system or apparatus 112. One example embodiment is shown in FIG. 1 includes an isolation valve 405 and insertion/retraction mechanisms 150. An APT primary element or probe 120 is extendable into a fluid carrying conduit 108, which in the illustrated exemplary embodiment is process piping, and is configured to measure a process variable of a process fluid in the process piping 108. Example process variables include flow, temperature, pressure, level, pH, conductivity, turbidity, density, concentration, chemical composition, etc. Process variable transmitter 102 includes a sensor 124 and other components/circuitry (not shown in FIG. 1) that are configured to receive a process variable from probe or APT primary element 120 and provide a transmitter output on process control loop 106. As discussed, in exemplary embodiments, process variable transmitter 102 is a differential pressure transmitter and probe 120 is an APT type of probe. Components of differential pressure transmitter 102 and probe or APT primary element 120 are described below in in greater detail.

In FIG. 1, the insertion/retraction mechanism 150, which is also referred to as insertion mechanism 150 and need not be used for retraction in all embodiments, is coupled to the APT primary element 120 and is configured to apply force to insert the APT primary element into the fluid carrying conduit 108. Mechanism 150 can include a variety of different components such as threaded control rods 415 and corresponding gear boxes 410, motors or hand cranks (crank mechanism 418) to power the gear boxes, etc. Components of an exemplary embodiment of mechanism 150 are shown and described in greater detail, for example, with reference to FIGS. 3 and 4.

In FIG. 1, the cut away portion of conduit or pipe 108 allows portion 122 of APT primary element 120, which diametrically spans the inside of process pipe 108, to be seen. The directional arrow 126 indicates the direction of fluid flow in pipe 108. In order to achieve the flow of fluid within piping or conduit 108, process pressures exist within the conduit. These process pressures must be overcome when inserting the APT primary element into the conduit. Sensor 124 of transmitter 102 is a pressure sensor 124 that is fluidically coupled to primary element 120 through passageways 130.

Also shown in FIG. 1 is bottoming indicator 160 to aid in the process of inserting APT primary element into the conduit 108. Bottoming indicator 160 can be any type of mechanism, device or system which is configured to provide an indication of proper bottoming of the distal tip 123 of the APT primary element 120 against the inner wall 121 of the process piping or fluid carrying conduit 108 as a function of an insertion related force or pressure. The insertion related force or pressure is, an exemplary embodiments, a force or pressure which is greater than a first force required to insert the APT primary element 120 into the fluid carrying conduit 108, and less than a second force which will damage the APT primary element or the fluid carrying conduit once the distal tip 123 of the APT primary element contacts the inner wall 121 of the fluid carrying conduit. As described in greater detail below, the bottoming indicator 160 can be configured to provide visual indication to an operator of proper bottoming of the distal tip of the APT primary element against the inner wall of the fluid carrying conduit. In addition, or in the alternative, the bottoming indicator can be configured to generate an output signal 162 (shown in FIG. 2) indicative of proper bottoming of the APT primary element. For example, the bottoming indicator 160 can include a pressure or force transducer configured to measure the insertion related force or pressure. In such alternate embodiments, the insertion mechanism 150 can be coupled to the bottoming indicator 160, directly or through a computer or controller, and configured to be controlled in response to the signal 162 such that the insertion mechanism stops applying the force to insert the APT primary element into the fluid carrying conduit when the control signal indicates proper bottoming of the distal tip of the APT primary element against the inner wall of the fluid carrying conduit. Thus, the insertion and retraction process can be automated while ensuring proper bottoming of the APT primary element.

Figure 2:
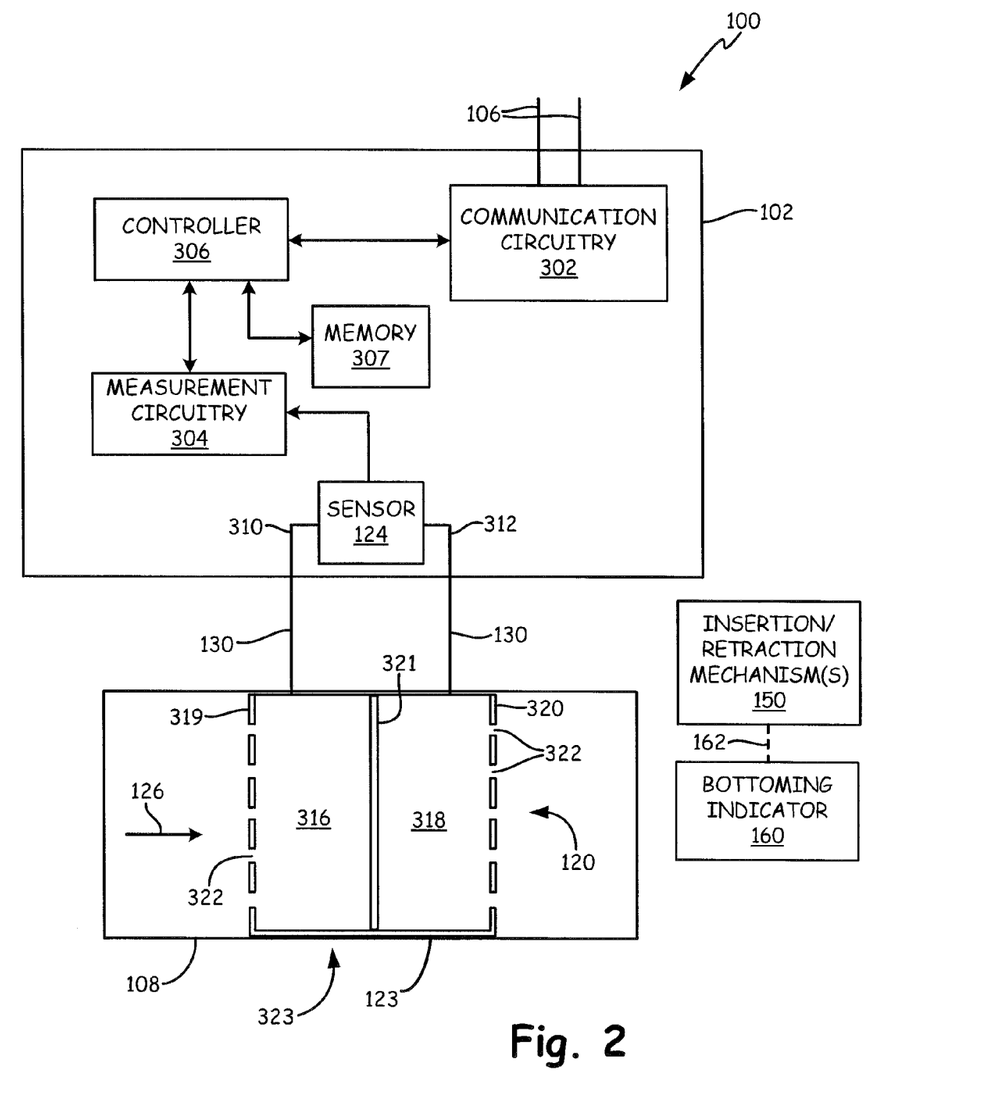
FIG. 2 is a block diagram of the system and transmitter shown in FIG. 1 in accordance with an example embodiment.

FIG. 2 is a system block diagram of an exemplary differential pressure measurement transmitter embodiment in system 100. As shown, system 100 includes flow transmitter 102 and APT primary element 120. As was the case in FIG. 1, system 100 includes insertion mechanism 150 and bottoming indicator 160 for use in inserting APT primary element 120 into conduit 108 with proper bottoming and while avoiding damage to the primary element or conduit. System 100 is coupleable to a process control loop such as loop 106 and is adapted to communicate a process variable output related to a differential pressure of fluid flow within conduit 108. Transmitter 102 of system 100 includes a loop communication circuitry 302, pressure sensor 124, measurement circuitry 304, and controller 306.

Loop communication circuitry 302 is coupleable to the process control loop 106 and is adapted to communicate upon the process control loop. Loop communication circuitry 302 can include circuitry for communicating over a wired communication link and/or a wireless communication link. Such communication can be in accordance with any appropriate process industry standard protocol such as the protocols discussed above, including both wired and wireless protocols.

In some exemplary embodiments, pressure sensor 124 includes first and second ports 310, 312 which are coupled to first and second plenums 316, 318 of APT probe 120, respectively, through passageways 130 and other conduits. Sensor 124 can be any device that has an electrical characteristic that changes in response to changes in applied pressure. For example, sensor 124 can be a capacitive pressure sensor the capacitance of which changes in response to the differential pressure applied between ports 310 and 312.

Measurement circuitry 304 is coupled to sensor 124 and is configured to provide a sensor output related at least to differential pressure between ports 310 and 312. Measurement circuitry 304 can be any electronic circuitry that can provide a suitable signal related to differential pressure. For example, measurement circuitry can be an analog-to-digital converter, a capacitance-to-digital converter or any other appropriate circuitry.

Controller 306 is coupled to measurement circuitry 304 and loop communication circuitry 302. Controller 306 is adapted to provide a process variable output to loop communication circuitry 302, which output is related to the sensor output provided by measurement circuitry 304. Controller 306 can be a programmable gate array device, a microprocessor, or any other appropriate device or devices. Although loop communication circuitry 302, measurement circuitry 304 and controller 306 have been described with respect to individual modules, it is contemplated that they can be combined such as on an Application Specific Integrated Circuit (ASIC). In an exemplary embodiment, memory 307 is included and is coupled to controller 306 for storage of computer readable instructions, parameter values, etc. used to configure controller 306 and/or measurement circuitry 304.

APT probe or primary element 120 is coupled to transmitter 102 by passageways 130 (and typically other conduits). Thus, in some exemplary embodiments, port 310 of sensor 124 is coupled to a first plenum 316 of the APT primary element, while port 312 of sensor 124 is coupled to a second plenum 318 of the primary element. A "plenum" is a passageway, a channel, a tube or the like into which fluid of a particular character or pressure is directed or admitted and through which the fluid is conducted or conveyed.

As shown diagrammatically in FIG. 2, probe 120 can include an upstream surface 319 extending the length of the probe, a downstream surface 320 extending the length of the probe, and a middle or center surface 321 separating plenums 316 and 318. In some exemplary embodiments, plenums 316 and 318 are formed between surfaces 319 and 321, and between surfaces 320 and 321, respectively. One or more openings 322 are formed in each of upstream surface 319 and downstream surface 320, allowing process fluid to enter plenums 316 and 318. Sensor 124 measures a differential pressure corresponding to the differential pressure between the process fluid in plenums 316 and 318. Although an example APT primary element design is illustrated in FIG. 2, disclosed embodiments are not limited to any particular APT primary element design or configuration.

Figure 3:
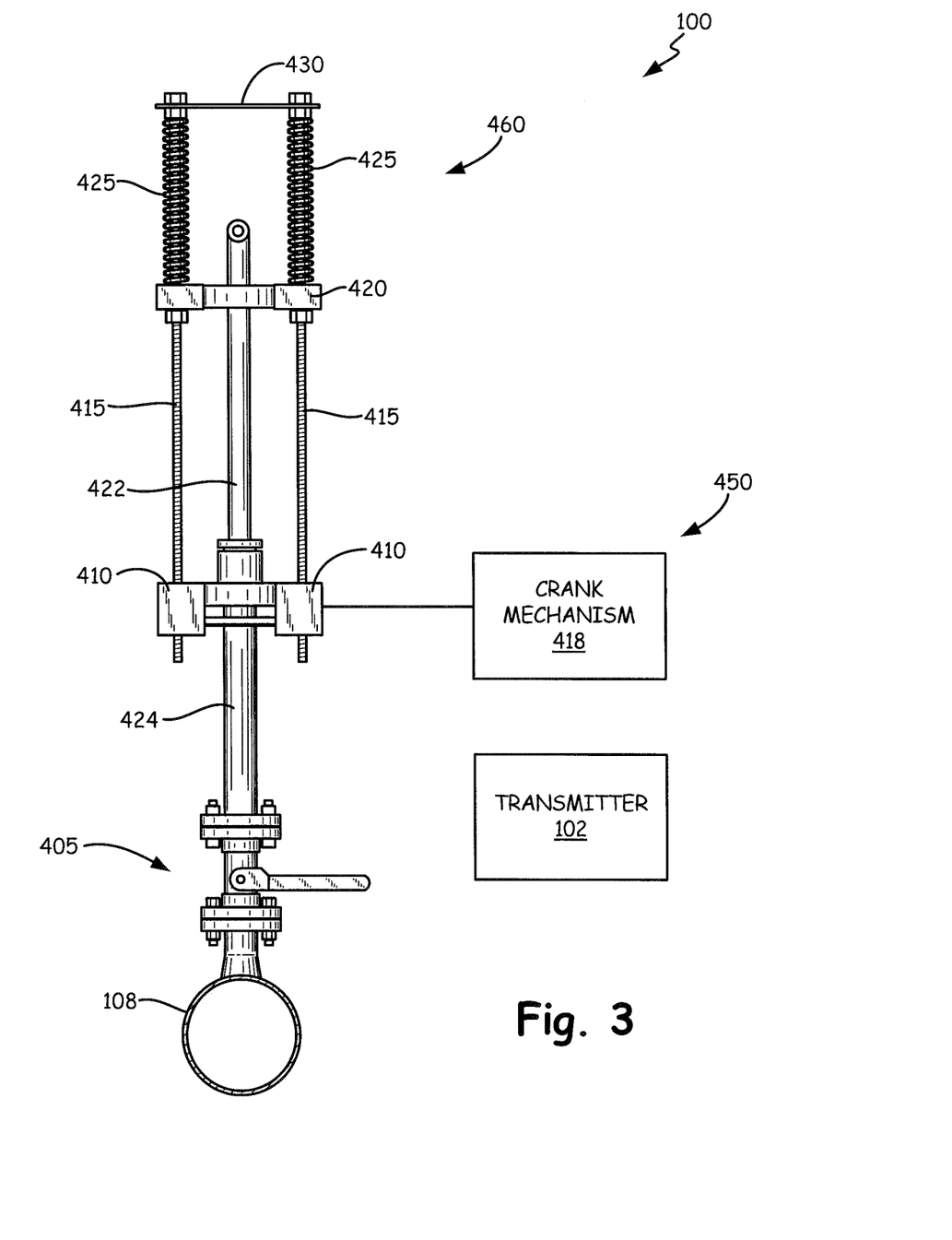
FIG. 3 is a diagrammatic illustration of a first embodiment of the bottom indicating components of the system of FIGS. 1 and 2.

Referring now to FIG. 3, shown is one example embodiment of system 100. In the system shown in FIG. 3, insertion/retraction mechanisms 450 represent an exemplary embodiment of mechanisms 150 shown in FIGS. 1 and 2, while bottoming indicator components 460 represent an exemplary embodiment of bottoming indicator 160. In FIG. 3, transmitter 102 is shown in block diagram form. An isolation valve 405 is coupled to process piping or conduit 108, allowing the APT primary element to travel through the valve into the conduit.

In this exemplary embodiment, insertion/retraction mechanisms 450 includes a pair of gearboxes 410, corresponding control rods or jacks 415, and a crank mechanism 418 such as a motor or a hand crank. Insertion/retraction mechanisms 450 is coupled to the gearboxes and configured to provide the gearboxes a rotational input. The control rods are coupled to a head plate 420 to transfer an insertion force or pressure to the APT primary element via rod or member 422 which reciprocates within tube 424 under the power and control of crank mechanism 418, gearboxes 410 and control rods 415.

In the embodiment illustrated in FIG. 3, in order to address the problem of installers not being able to "feel" when the distal tip of the APT primary element has bottomed on the opposite side pipe or wall of conduit 108, bottoming indicator 460 includes one or more bottom load springs 425 inserted between the jack screws/control rods 415 and head plate 420, and an optional anti-torsion plate 430. The compression of the spring(s) 425 gives a clear visual indication when the APT primary element is properly bottomed. For example, there several alternative ways by which spring(s) 425 or similar mechanisms can be used to indicate to the installer when the tip has bottomed.

In a first technique, using careful calculations in the design, the APT primary element is properly bottomed when the spring or springs 425 are fully collapsed. The springs effectively transfer the insertion force from the crank mechanism 418, which is "grounded" to the process piping, to the primary element which acts like a piston traveling through the process piping until it is bottomed. The spring or springs are sized such that the compressive force to fully collapse the spring or springs is greater than the sum of the process pressure, the friction force from the packing glands which prevent the process fluid from leaking through the insertion connection, and the force required to pin the APT primary element against the opposite conduit wall, but is less than the force required to buckle the primary element or shear through the opposite conduit wall. The operator simply continues turning the installation crank handle or operating the motor of crank mechanism 418 until the spring or springs 425 are completely compressed. Once the springs are fully compressed, the operator can be confident that the tip of the APT primary element is properly bottomed and not over compressed. In various embodiments, different APT primary element sizes and different process applications can require different spring rates, and therefor different sized springs 425.

Figure 4:
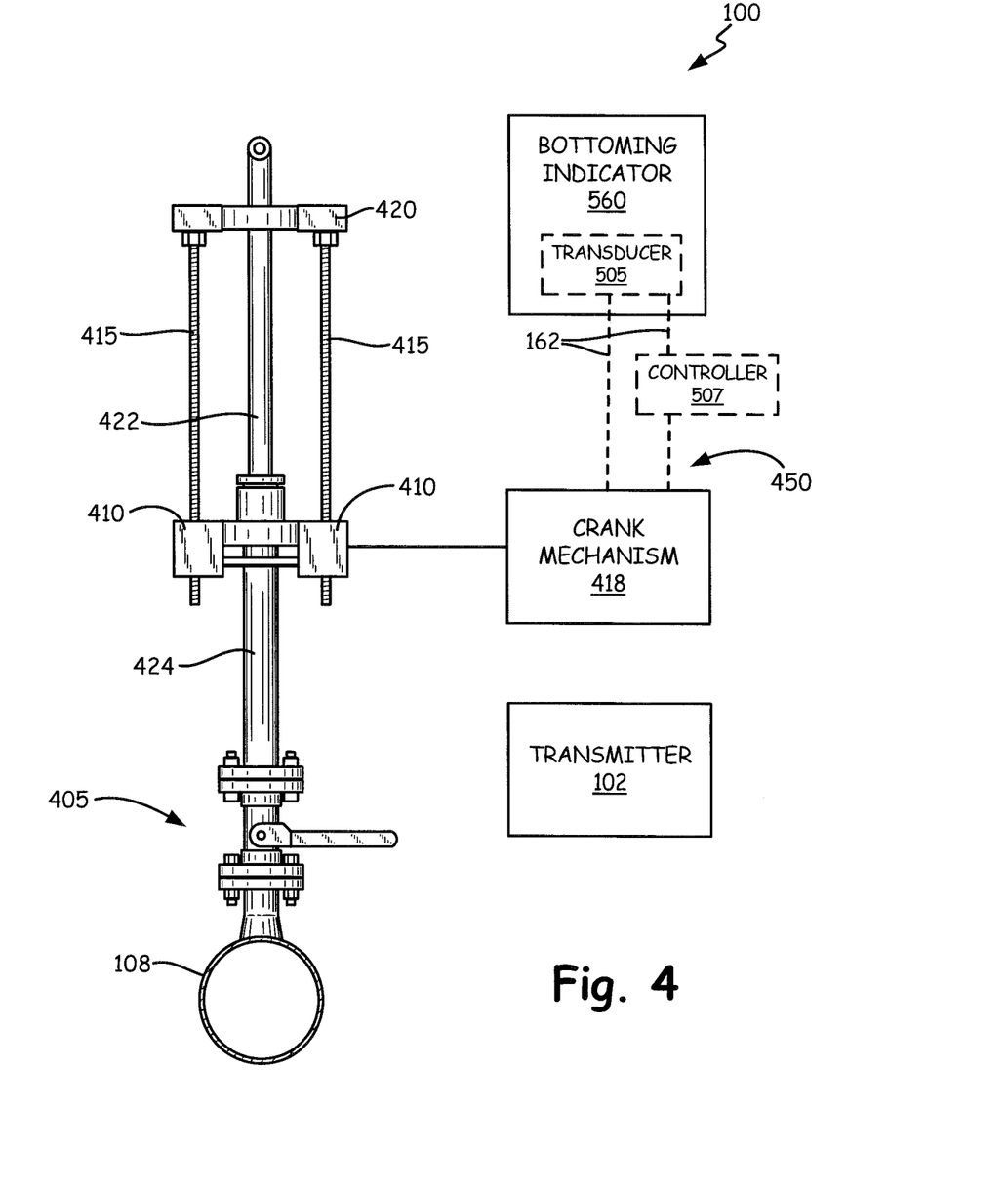
FIG. 4 is a diagrammatic illustration of a second embodiment of the bottom indication components of the system of FIGS. 1 and 2.
Figure 51:
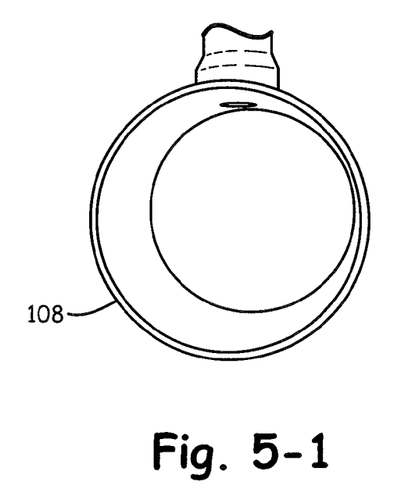
Figure 52:
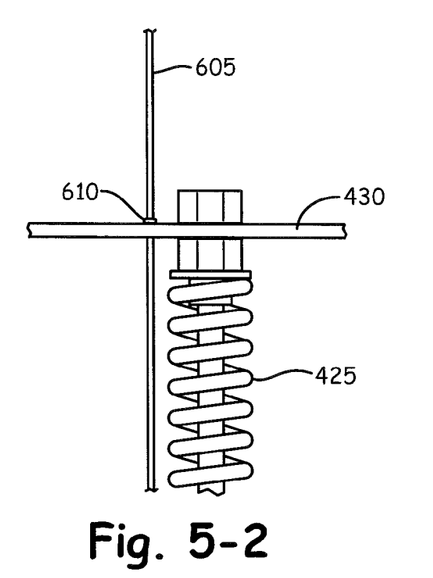
Figure 53:
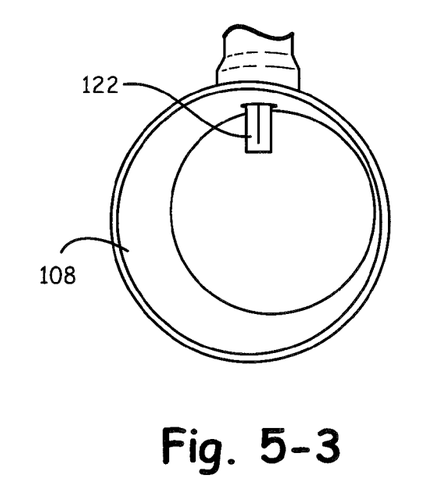
Figure 54:
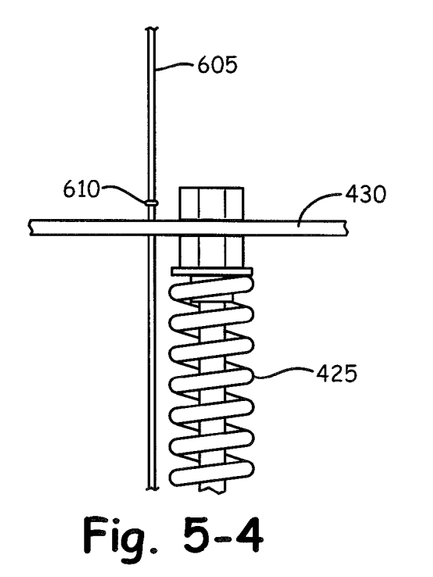
Figure 55:
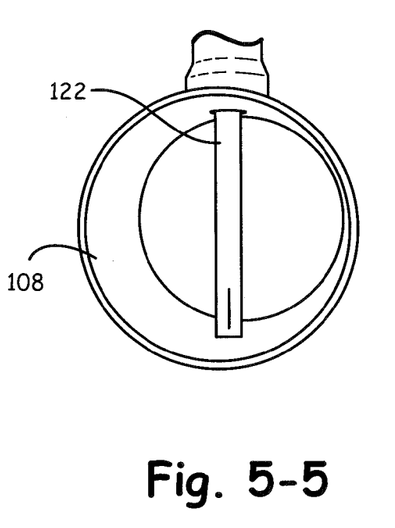
Figure 56:
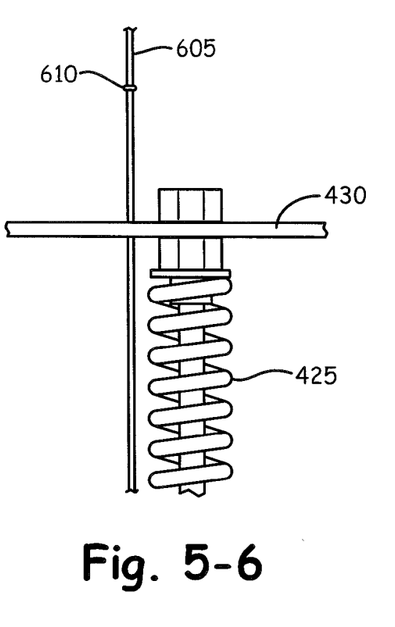

A second technique for indicating when the APT primary element tip is properly bottomed can be implemented using the bottoming indicator embodiment 560 shown in FIG. 4. In this embodiment, bottoming indicator 560 can be a "fish scale" type indicator. While turning the crank handle or operating the motor of crank mechanism 418 to insert the APT primary element, the operator would zero or tare the "fish scale" type bottoming indicator to account for the process pressure and the friction from the packing gland. Once the tip touched the opposite side pipe wall the operator would continue to operate the crank mechanism until the "fish scale" read the specified tip bottoming force. In some embodiments, the tip bottoming force can be specified on the APT primary element. When the "fish scale" reads the specified force, the installer would know the primary element tip was bottomed correctly.

In some embodiments, bottoming indicator 560 includes a pressure or force transducer 505 which provides an output signal 162. If instead of a spring, pressure or force transducer 505 is placed between or coupled to the control rods 415 and head plate 420 to measure insertion and bottoming forces, the output signal 162 can be used to control insertion/retraction mechanisms 450, either through a direct connection or through use of a separate controller or computer 507 to allow the automation of the primary element insertion and retraction process. By combining the signal 162 from the force/pressure transducer 505 with an automated type of isolation valve 405 and an automated insertion/reatraction mechanisms 450, the APT primary element can be automatically retracted and inserted without the need of a field technician to "feel" when the tip had bottomed. This is especially advantageous for oil and natural gas lines. Instead of sending out field technicians to retract the APT primary element before "pigging" and sending the technicians back out after pigging to re-insert the primaries, the whole process is automated.

Another illustrative embodiment which demonstrates visual indication of various states of APT primary element insertion when using one or more springs 425 is provided in FIGS. 5-1 through 5-6. As shown in FIGS. 5-1 and 5-2, with the APT primary element fully retracted, the load spring has not been compressed. To aid in the illustration of this initial position, a position indicator stick or wire 605 is extended through anti-torsion plate 430, and an O-ring or other visual marker 610 is placed on the position indicator stick or wire such that it is touching or proximate a reference point or feature such as the plate 430.

After the isolation valve has been opened and the installer has started cranking on the gear boxes to install the primary element 120, process pressure and packing resistance will cause the spring 425 to compress a small amount. This can be clearly seen by the installer when the bottoming indicator O-ring 610 "lifts" off of the anti-torsion plate 430. An example of the partially inserted APT primary element 120 and bottoming indicator O-ring 610 can be seen in FIGS. 5-3 and 5-4. As shown in FIGS. 5-5 and 5-6, the installer will witness the indicator or "O-ring" 610 moving further away from the plate 430 after the tip has bottomed. The difference between the O-ring position after bottoming and the O-ring position during installation represents the bottoming force as the springs are compressed. This example shown in FIGS. 5-1 through 5-6 demonstrates the general concept of isolating process pressure and packing resistance/drag forces from the bottoming force. Any visual or automated techniques for controlling the insertion process to ensure proper bottoming based on these pressures or forces is contemplated to be within the scope of disclosed embodiments.

Although the present invention has been described with reference to preferred embodiments, workers skilled in the art will recognize that changes may be made in form and detail without departing from the spirit and scope of the invention. In one configuration, a gaged or marked indicator stick or wire with indications are used instead of an O-ring. The user can note what gage reading is on the stick at each level of insertion, and when the reading is consistently rising, the APT is sufficiently bottomed. Further, although specific embodiments using an APT are discussed, any type of process measurement probe may be used. As used herein, the term "proper bottoming" refers to a digital end of a measurement probe being seated against an inner wall of a fluid carrying conduit with a desired force. Typically, the desired force will be sufficient to prevent or reduce vibration of the probe due to flow of process fluid or other causes, but less than an amount which would damage the probe.

What is claimed is:

1. A system for indicating bottoming contact between an inner wall of a fluid carrying conduit and a distal tip of a process measurement probe, the system comprising:
    a process device having the process measurement probe configured for insertion into the fluid carrying conduit;
    an insertion mechanism coupled to the process measurement probe and configured to apply force to insert the process measurement probe into the fluid carrying conduit; and
    a bottoming indicator configured to provide an indication of proper bottoming of the distal tip of the process measurement probe against the inner wall of the fluid carrying conduit as a function of an insertion related force or pressure;
    wherein the bottoming indicator is configured to provide a visual indication of proper bottoming of the distal tip of the process measurement probe against the inner wall of the fluid carrying conduit;
    wherein the bottoming indicator includes a visual marker which moves when proper bottoming of the distal tip of the process measurement probe against the inner wall of the fluid carrying conduit is achieved.

2. The system of claim 1, wherein the insertion related force or pressure corresponds to a force which is greater than a first force required to insert the process measurement probe into the fluid carrying conduit, and less than a second force which will damage the process measurement probe or the fluid carrying conduit once the distal tip of the process measurement probe contacts the inner wall of the fluid carrying conduit.

3. The system of claim 1, wherein the bottoming indicator includes at least one spring which compresses in response to application of the force from the insertion mechanism to insert the process measurement probe.

4. The system of claim 3, wherein the at least one spring of the bottoming indicator has a spring compressive force which causes the at least one spring to compress a predetermined amount when the distal tip of the process measurement probe is properly bottomed against the inner wall of the fluid carrying conduit.

5. The system of claim 4, wherein the spring compressive force of the at least one spring of the bottoming indicator is such that the at least one spring of the bottoming indicator fully collapses when the process measurement probe is properly bottomed against the inner wall of the fluid carrying conduit.

6. The system of claim 5, wherein the spring compressive force to fully collapse the at least one spring of the bottoming indicator is greater than a sum of a force from the process pressure in the fluid carrying conduit, a friction force from packing glands associated with the process control device, and a force required to pin the process measurement probe against the inner wall of the fluid carrying conduit.

7. The system of claim 1, wherein the bottoming indicator includes at least one spring which compresses in response to application of the force from the insertion to provide the visual indication of proper bottoming of the distal tip of the process measurement probe against the inner wall of the fluid carrying conduit.

8. The system of claim 1, wherein the bottoming indicator is a fish scale type of indicator which provides a visual output of when the bottoming indicator has read a predetermined force or pressure indicative of proper bottoming of the distal tip of the process measurement probe against the inner wall of the fluid carrying conduit.

9. The system of claim 8, wherein the fish scale type of indicator is configured to be tared or zeroed by an operator to account for process pressure and friction from a packing gland.

10. The system of claim 1, wherein the visual marker comprises an O-ring, gaged stick, or other indicator.

11. The system of claim 1, wherein the process device is a fluid flow meter.

12. The system of claim 1 wherein the process measurement probe comprises an averaging pitot tube (APT) primary element.

13. A system for indicating bottoming contact between an inner wall of a fluid carrying conduit and a distal tip of a process measurement probe, the system comprising:
  a process device having the process measurement probe configured for insertion into the fluid carrying conduit;
  an insertion mechanism coupled to the process measurement probe and configured to apply force to insert the process measurement probe into the fluid carrying conduit; and
  a bottoming indicator configured to provide an indication of proper bottoming of the distal tip of the process measurement probe against the inner wall of the fluid carrying conduit as a function of an insertion related force or pressure;
  wherein the bottoming indicator is configured to generate an output signal indicative of proper bottoming of the distal tip of the process measurement probe against the inner wall of the fluid carrying conduit;
  wherein the bottoming indicator includes a pressure or force transducer configured to measure the insertion related force or pressure and to provide the output signal.

14. The system of claim 13 wherein the system is automated to automatically control insertion of the process measurement probe into the fluid carrying conduit using the output signal.

15. The system of claim 13 wherein the insertion mechanism is coupled to the bottoming indicator and is configured to be controlled in response to the output signal such that the insertion mechanism stops applying the force to insert the process measurement probe into the fluid carrying conduit when the output signal indicates proper bottoming of the distal tip of the process measurement probe against the inner wall of the fluid carrying conduit.

16. The system of claim 13 wherein the process device is a fluid flow meter.

17. The system of claim 13 wherein the process measurement probe comprises an averaging pitot tube (APT) primary element.

18. The system of claim 13 wherein the insertion related force or pressure corresponds to a force which is greater than a first force required to insert the process measurement probe into the fluid carrying conduit, and less than a second force which will damage the process measurement probe or the fluid carrying conduit once the distal tip of the process measurement probe contacts the inner wall of the fluid carrying conduit.

19. The system of claim 13 wherein the bottoming indicator includes at least one spring which compresses in response to application of the force from the insertion mechanism to insert the process measurement probe.

20. The system of claim 19 wherein the at least one spring of the bottoming indicator has a spring compressive force which causes the at least one spring to compress a predetermined amount when the distal tip of the process measurement probe is properly bottomed against the inner wall of the fluid carrying conduit.

21. The system of claim 20 wherein the spring compressive force of the at least one spring of the bottoming indicator is such that the at least one spring of the bottoming indicator fully collapses when the process measurement probe is properly bottomed against the inner wall of the fluid carrying conduit.

22. The system of claim 21 wherein the spring compressive force to fully collapse the at least one spring of the bottoming indicator is greater than a sum of a force from the process pressure in the fluid carrying conduit, a friction force from packing glands associated with the process control device, and a force required to pin the process measurement probe against the inner wall of the fluid carrying conduit.

* * * * *